United States Patent
Kohr et al.

(10) Patent No.: US 11,988,281 B2
(45) Date of Patent: May 21, 2024

(54) METHOD AND CONTROL UNIT FOR OPERATING A MOTOR VEHICLE

(71) Applicant: ZF Friedrichshafen AG, Friedrichshafen (DE)

(72) Inventors: Tobias Kohr, Bodnegg (DE); Michael Sohler, Isny (DE); Franz Brugger, Friedrichshafen (DE); Bernd Haegele, Ravensburg (DE); Patrick Ledig, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 143 days.

(21) Appl. No.: 17/676,401

(22) Filed: Feb. 21, 2022

(65) Prior Publication Data
US 2022/0268359 A1 Aug. 25, 2022

(30) Foreign Application Priority Data
Feb. 22, 2021 (DE) .......................... 102021201650.2

(51) Int. Cl.
| F16H 63/36 | (2006.01) |
| F16H 59/44 | (2006.01) |
| F16H 59/66 | (2006.01) |
| F16H 63/48 | (2006.01) |

(52) U.S. Cl.
CPC .............. *F16H 63/36* (2013.01); *F16H 59/44* (2013.01); *F16H 59/66* (2013.01); *F16H 63/48* (2013.01); *F16H 2059/446* (2013.01); *F16H 2059/663* (2013.01)

(58) Field of Classification Search
CPC .......... F16H 63/36; F16H 59/44; F16H 59/66; F16H 63/48; F16H 2059/446; F16H 2059/663
See application file for complete search history.

(56) References Cited

U.S. PATENT DOCUMENTS

| 5,685,406 A | 11/1997 | Crum et al. |
| 10,823,286 B2 | 11/2020 | Schlosser et al. |
| 2019/0003589 A1* | 1/2019 | Haugg .................. F16H 63/34 |
| 2020/0003264 A1* | 1/2020 | Lenßen .................. F16H 35/10 |
| 2021/0394601 A1 | 12/2021 | Führer et al. |

FOREIGN PATENT DOCUMENTS

| DE | 3345524 C2 * | 12/1983 | ............. B60K 17/02 |
| DE | 10255714 A1 | 6/2004 | |
| DE | 102009004263 B4 | 7/2010 | |

(Continued)

OTHER PUBLICATIONS

German Search Report DE 10 2021 201 650.2, dated Sep. 7, 2021. (10 pages).

*Primary Examiner* — Zakaria Elahmadi
(74) *Attorney, Agent, or Firm* — Dority & Manning, P.A.

(57) ABSTRACT

A method for operating a motor vehicle with a prime mover (1), a drive output (2), and a parking lock (4) is provided. The parking lock (4), in an engaged condition, blocks a shaft (3) coupled to the drive output (2) and, in a disengaged condition, releases the shaft (3). In order to disengage the parking lock (4), at least one coupling mass (6) is coupled to the shaft (3), which is coupled to the drive output (2), while increasing the moment of inertia effective at the shaft (3).

10 Claims, 2 Drawing Sheets

(56) References Cited

FOREIGN PATENT DOCUMENTS

| | | | |
|---|---|---|---|
| DE | 102016220282 A1 * | 4/2018 | ............. F16H 59/66 |
| DE | 102017211025 A1 | 1/2019 | |
| DE | 102018202370 A1 | 8/2019 | |
| DE | 102018218535 A1 | 4/2020 | |
| DE | 102019107580 A1 | 10/2020 | |
| EP | 0823359 B1 | 2/1998 | |
| WO | WO 2020/089304 | 5/2020 | |

* cited by examiner

| | A | B | C | D | E |
|---|---|---|---|---|---|
| 1 | • | • | • | | |
| 2 | • | • | | | • |
| 3 | | • | • | | • |
| 4 | | • | | • | • |
| 5 | | • | • | • | |
| 6 | | | • | • | • |
| 7 | • | | • | • | |
| 8 | • | | | • | • |
| R | • | • | | • | |

METHOD AND CONTROL UNIT FOR OPERATING A MOTOR VEHICLE

CROSS-REFERENCE TO RELATED APPLICATION

The present application is related and has right of priority to German Patent Application No. 102021201650.2 filed in the German Patent Office on Feb. 22, 2021, which is incorporated by reference in its entirety for all purposes.

FIELD OF THE INVENTION

The invention relates generally to a method for operating a motor vehicle. Moreover, the invention relates generally to a control unit for carrying out the method.

BACKGROUND

It is known from practical experience to secure a motor vehicle at a standstill against unintentionally rolling away via a parking lock. A parking lock provides a mechanical interlock of the drive train of the motor vehicle. Due to this mechanical interlock, a shaft coupled to the drive output of the motor vehicle is blocked and, in this way, a rotation of this shaft and of the drive output is prevented, and so the motor vehicle is secured against rolling away.

A parking lock typically includes a parking pawl and a parking interlock gear. The parking pawl interacts with the parking interlock gear to mechanically interlock the drive train in such a way that, for the case in which the parking pawl engages into the parking interlock gear, which is connected to the shaft coupled to the drive output of the motor vehicle, the parking lock is engaged and the shaft and, thereby, the drive output are blocked.

A parking lock typically also includes a parking lock actuator, a parking lock detent, and a parking lock sensor. The parking lock actuator is utilized for actuating the parking pawl in order to engage or disengage the parking lock via the actuation of the parking pawl. The parking lock detent is utilized for locking and releasing the parking lock actuator. If a parking lock actuator is locked via the parking lock detent, the parking pawl cannot be actuated. A condition of the parking lock can be detected via the parking lock sensor.

DE 10 2009 004 263 B4 and DE 10 2017 211 025 A1 both disclose parking locks of motor vehicles. Parking locks of motor vehicles are also known from EP 0 823 359 B1 and DE 10 2018 202 370 A1.

DE 102 55 714 A1 discloses a method for operating a motor vehicle, namely a method for the open-loop control of an automatic transmission having multiple shift elements and having a parking lock. When the parking lock is activated, the drive output is interlocked, in order to lock the drive output, via at least one friction-locking shift element of the transmission, which is disengaged, in a controlled manner, after the deactivation of the parking lock.

For the case in which a motor vehicle on a hillside is secured with a parking lock against rolling away, a high load acts upon the parking lock. Due to this load, components of the drive train can be abruptly accelerated upon disengagement of the parking lock. The entire load that was held via the parking lock when the parking lock was engaged results, upon disengagement of the parking lock, in an acceleration of assemblies and components of the drive train. As a result, these assemblies and components of the drive train can become damaged.

There is a need to reduce the risk of damage to components of the drive train upon disengagement of the parking lock.

SUMMARY OF THE INVENTION

Example aspects of the invention provide a new type of method and a control unit for operating a motor vehicle.

According to example aspects of the invention, in order to disengage the parking lock, at least one coupling mass is coupled to the shaft, which is coupled to the drive output, while increasing the moment of inertia effective at the shaft.

According to example aspects of the present invention, it is provided, in order to disengage the parking lock, to couple at least one coupling mass—preferably before the parking lock is disengaged—to the shaft, which is still blocked, while increasing the moment of inertia effective at the shaft.

Due to the increase of the moment of inertia effective at the output-side shaft, angular speeds and angular accelerations occurring upon disengagement of the parking lock can be reduced. Due to this reduction of the angular speeds and angular accelerations, the load on the drive train and, in fact, on components of the drive train coupled to the output-side shaft, is reduced. As a result, the risk of damage to such components of the drive train upon disengagement of the parking lock is reduced.

According to one advantageous example refinement of the invention, before the parking lock is disengaged, a load is calculated, which acts upon the parking lock, or is dependent thereon, before the parking lock is disengaged. For the case in which this calculated load is greater than a limit value, before the parking lock is disengaged, the at least one coupling mass is coupled to the shaft, which is still blocked, while increasing the moment of inertia effective at the shaft. With this example refinement of the invention, the load is calculated, which acts upon the parking lock before the parking lock is disengaged. The at least one coupling mass is coupled to the shaft before the parking lock is disengaged only for the case in which this load is greater than a limit value. If the load is less than the limit value, however, this is not necessary.

Preferably, depending on the size of the load that acts upon the parking lock before the parking lock is disengaged, the at least one coupling mass is determined, which is coupled to the shaft, which is still blocked, before the parking lock is disengaged. As a result, it is possible to determine the coupling mass according to demand and couple the coupling mass to the shaft according to demand.

Preferably, the load that acts upon the parking lock before the parking lock is disengaged is calculated depending on a mass of the motor vehicle and depending on an uphill grade of a roadway, on which the motor vehicle is stopped. The calculation of the load acting upon the parking lock before the parking lock is disengaged is easily and reliably possible depending on the mass of the motor vehicle and the uphill grade of the roadway, on which the motor vehicle is stopped.

BRIEF DESCRIPTION OF THE DRAWINGS

Exemplary embodiments of the invention are explained in greater detail with reference to the drawing, without being limited thereto, in which.

DETAILED DESCRIPTION

Figure 1:
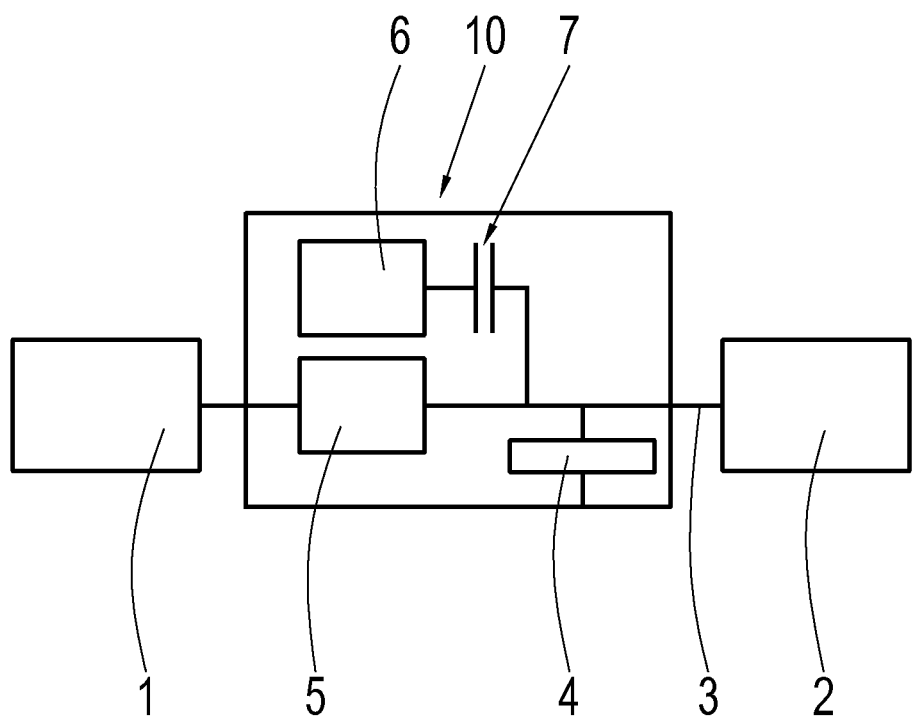
FIG. 1 shows a diagram of a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a highly schematic diagram of a drive train of a motor vehicle, which includes a prime mover 1 and a drive output 2. The prime mover 1 can be an internal combustion engine, a hybrid drive, or also an electric machine.

FIG. 1 also shows a shaft 3, which is coupled to the drive output 2, and a parking lock 4. For the case in which the parking lock 4 has been engaged in order to mechanically interlock and, thereby, secure the motor vehicle against unintentionally rolling away, the parking lock 4 blocks the shaft 3, which is coupled to the drive output 2. A mass 5, which is dependent on the configuration of the drive train, then acts at this blocked shaft 3.

Figure 2:
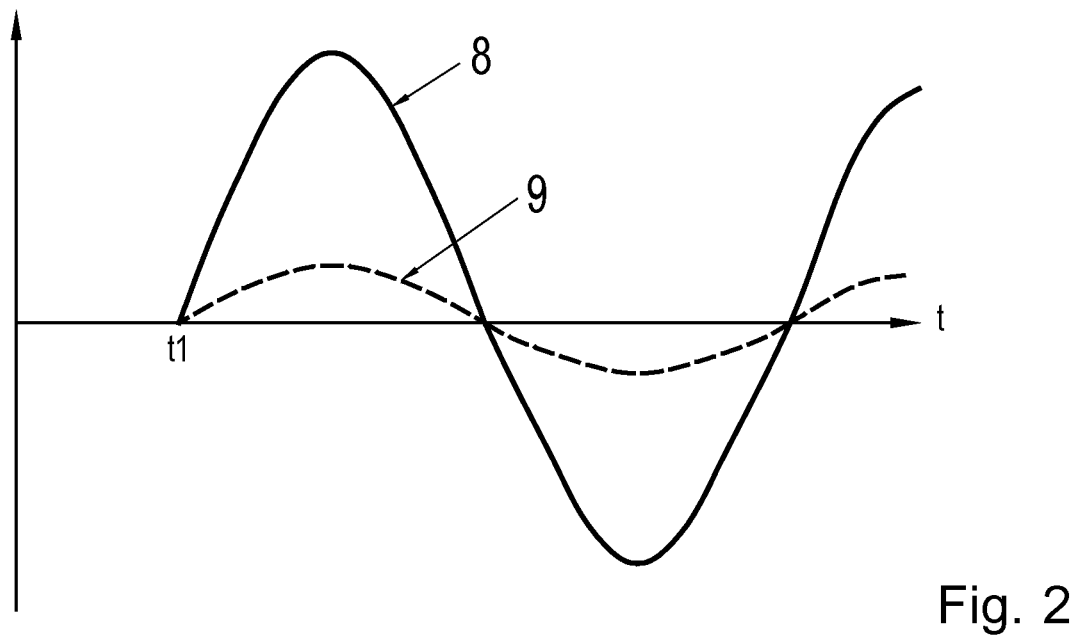
FIG. 2 shows a time-dependency diagram for illustrating example aspects of the invention.

In particular for the case in which a motor vehicle is stopped on a hillside with the parking lock 4 engaged, a relatively high load acts upon the parking lock 4, which, upon disengagement of the parking lock 4, is applied at the shaft 3, which was previously blocked and, after the disengagement of the parking lock 4, was released, and results in a relatively great angular acceleration of the previously blocked shaft 3. FIG. 2 shows a time profile 8 of an angular speed with respect to time t, which can form at the previously blocked shaft 3 upon disengagement of the parking lock 4. Components of the drive train that are coupled to the shaft 3 can become damaged at high angular speeds and angular accelerations at the shaft 3.

It is provided to couple a coupling mass 6 to the shaft 3, which is still blocked, while increasing the moment of inertia effective at the shaft 3 in order to disengage the parking lock 4 and, in fact, before disengaging the parking lock 4. FIG. 1 shows a shift element 7 connected between the shaft 3 and the coupling mass 6, which, for the case in which the shift element 7 is disengaged, decouples the coupling mass 6 from the shaft 3 and, for the case in which the shift element 7 is engaged, couples the coupling mass 6 to the shaft 3.

In particular, before the parking lock 4 is disengaged, the load is calculated that acts upon the parking lock 4 before the parking lock 4 is disengaged. This load can be calculated depending on the mass of the motor vehicle and the uphill grade of a roadway, on which the motor vehicle is stopped.

For the case in which this calculated load is greater than a limit value, the coupling mass 6 is coupled to the shaft 3, which is still blocked, by engaging the shift element 7 before the parking lock 4 is disengaged. As a result, the moment of inertia effective at the shaft 3 increases, and so angular speeds and angular accelerations at the shaft 3, which is now released, can be reduced during the subsequent disengagement of the parking lock 4.

For the case in which this calculated load is less than the limit value, the coupling mass 6 is not coupled to the shaft 3 before the parking lock 4 is disengaged.

The curve profile 9 from FIG. 2 shows a time profile of the angular speed that can be achieved with example aspects of the invention by coupling the coupling mass 6 to the shaft 3. Angular speeds and angular accelerations are reduced as compared to the curve profile 8. The risk of damage to the drive train can be reduced in this way.

With example aspects of the invention, it is possible, depending on the size of the load that acts upon the parking lock 4 before the parking lock 4 is disengaged, to determine the size of the coupling mass that is then coupled to the shaft 3 before the parking lock 4 is disengaged.

In this way, appropriate partial coupling masses can be coupled to the blocked shaft 3 before the parking lock 4 is disengaged, according to demand, via appropriate shift elements in order to couple a coupling mass that is optimally adapted to the size of the load.

The parking lock 4, the masses 5 and 6, and the shift element 7 from FIG. 1 can be an integral part of a transmission 10, which is coupled between the prime mover 1 and the drive output 2 and, for the case in which a gear is engaged in the transmission 10, couples the prime mover 1 to the drive output 2.

Figures 3, 4:
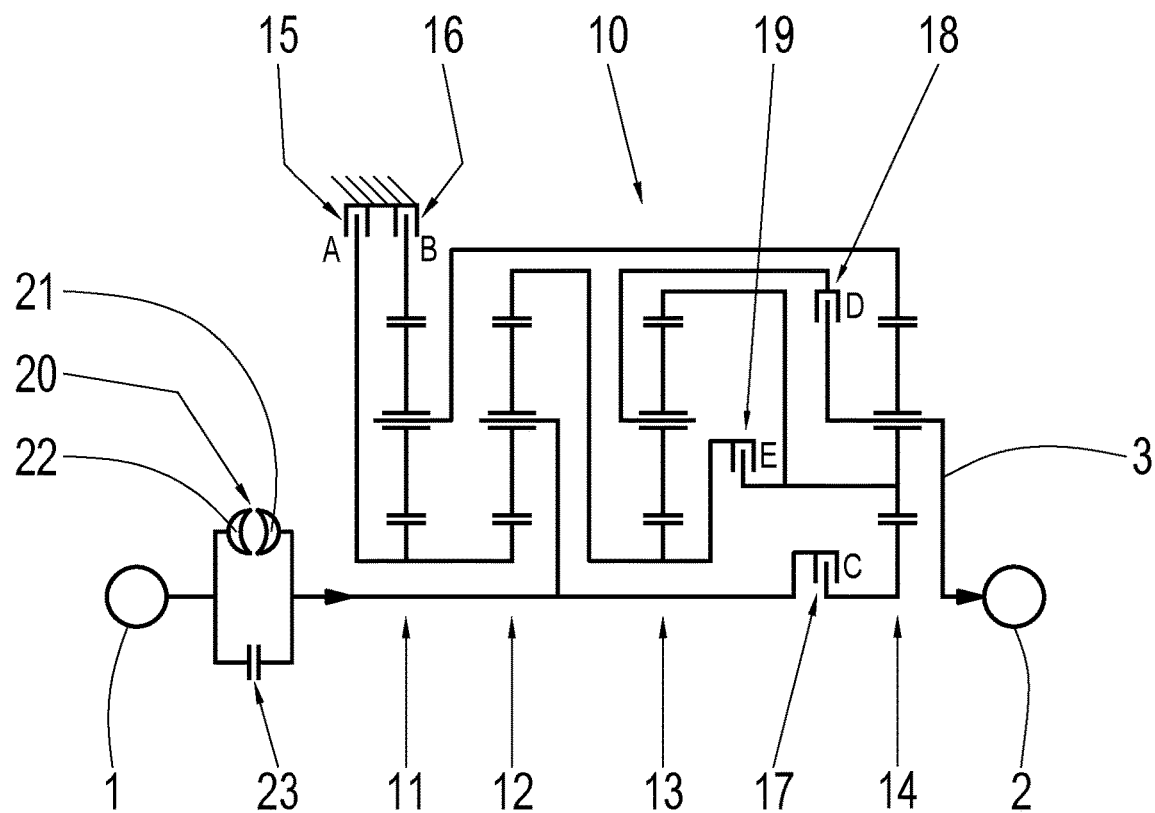
FIG. 3 shows one further diagram of a drive train of a motor vehicle including an exemplary transmission.
FIG. 4 shows a gear shift matrix of the transmission from FIG. 3.

FIG. 3 shows, by way of example, the configuration of a transmission 10 including multiple gear sets 11, 12, 13, and 14 as well as multiple shift elements 15, 16, 17, 18, and 19, wherein the shift elements 15 and 16 are friction-locking brakes A and B and the shift elements 17, 18, and 19 are friction-locking clutches C, D, and E.

FIG. 4 shows a gear shift matrix of the transmission 10 from FIG. 3, wherein it is apparent from FIG. 4 that a total of eight force-locking and, thereby, tractive force-transmitting forward gears and one force-locking and, thereby, tractive force-transmitting reverse gear can be provided by the transmission 10. In each of these tractive force-transmitting gears, a first defined number of shift elements, namely three shift elements, is engaged, whereas a defined second number of shift elements, namely two shift elements, is disengaged in each tractive force-transmitting and, thereby, force-locking gear.

The shift elements that are engaged in the particular tractive force-transmitting gear are marked by a dot in FIG. 4. In the forward gear 1, the shift elements A, B, and C are engaged. In the forward gear 2, the shift elements A, B, and E are engaged. In the reverse gear R, the shift elements A, B, and D are engaged.

In the example from FIG. 3, moreover, a hydrodynamic starting component is shown, which is coupled between the prime mover 1 and the transmission 10, wherein the hydrodynamic starting component includes a torque converter 20 and a torque converter lockup clutch 23 connected in parallel to the torque converter.

With respect to the torque converter 20, a turbine 21 and a pump 22 are shown. The pump 22 is coupled to the prime mover 1 and the turbine 21 is coupled to the transmission 10.

If the motor vehicle schematically shown in FIG. 3 is secured on a hillside against rolling away via a parking lock 4 (not shown in FIG. 3), when the prime mover 1 in FIG. 3 is running, the shift elements 15 and 16, i.e., the brakes A and B, are at least partially engaged, in particular up to an engagement point. For the case in which the load acting upon the engaged parking lock 4, which becomes effective at the shaft 3 before the parking lock 4 is disengaged, is greater than a limit value, additional mass, i.e., a coupling mass 6, can be coupled to the shaft 3, in FIG. 3, by engaging, in particular, the shift element 16, i.e., the clutch B, as the result of which the moment of inertia effective at the shaft 3 is increased. If the blocking of the shaft 3 is then released due to the disengagement of the parking lock 4, the angular speed and angular acceleration at the shaft 3, which is now released, is reduced, as the result of which loads for the components of the drive train that are coupled to the shaft 3 are reduced.

Accordingly, in FIG. 3, a defined coupling mass can be connected to the shaft 3 by engaging the brake B. This coupling mass can be increased when the transmission 10 is interlocked, for example, by engaging the shift elements 15, 16, and 17 as well as one further shift element. The particular coupling mass is determined, in particular, by assemblies and, thereby, masses of the transmission.

As the coupling mass 6, the mass of an electric machine or of another component of the drive train can also be connected to the shaft 3, which is blocked via a parking lock 4, before the parking lock 4 is disengaged.

The invention also relates to a control unit for operating a motor vehicle, which is configured for implementing the above-described method on the control side.

This control unit is preferably a transmission control unit, which controls the operation of the transmission 10 by way of an open-loop and/or closed-loop system. The transmission control unit is not shown in the figures.

The control unit according to example aspects of the invention actuates at least one assembly in order to couple the at least one coupling mass 6 to the blocked shaft 3 before the parking lock 4 is disengaged and the moment of inertia effective at the shaft 3 is increased.

In this context, before the parking lock 4 is disengaged, the control unit determines the load that acts upon the parking lock 4 before the parking lock 4 is disengaged. The control unit calculates this load preferably depending on the mass of the motor vehicle and the uphill grade of the roadway, on which the motor vehicle is stopped.

The control unit determines, depending on the size of the calculated load, the at least one coupling mass 6, which is coupled to the shaft 3 before the parking lock 4 is disengaged, and the at least one assembly 7 to be actuated for this purpose.

Depending on the size of the load, the control unit then actuates the at least one assembly 7 in order to couple the at least one coupling mass 6 to the shaft 3, which is still blocked, before the parking lock 4 is disengaged. Due to the disengagement of the parking lock 4, the previously blocked shaft 3 is released.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 prime mover
2 drive output
3 shaft
4 parking lock
5 mass
6 coupling mass
7 shift element
8 angular speed profile
9 angular speed profile
10 transmission
11 gear set
12 gear set
13 gear set
14 gear set
15 shift element A
16 shift element B
17 shift element C
18 shift element D
19 shift element E
20 torque converter
21 turbine
22 pump
23 torque converter lockup clutch

The invention claimed is:

1. A method for operating a motor vehicle that includes a prime mover (1), a drive output (2), and a parking lock (4), the parking lock (4) configured to block a shaft (3) coupled to the drive output (2) in an engaged condition and to release the shaft (3) in a disengaged condition, the method comprising:
coupling at least one coupling mass (6) to the shaft (3) when the shaft is blocked in order to increase a moment of inertia effective at the shaft (3); and
disengaging the parking lock (4) while the at least one coupling mass (6) is coupled to the shaft (3).

2. The method of claim 1, further comprising:
prior to disengaging the parking lock (4), calculating a load acting upon the parking lock (4) or a load dependent upon the parking lock (4); and
when the calculated load is greater than a limit value, coupling the at least one coupling mass (6) to the blocked shaft (3).

3. The method of claim 2, further comprising determining the at least one coupling mass (6) based on a size of the calculated load.

4. The method of claim 2, wherein calculating the load comprises calculating the load based on a mass of the motor vehicle and a grade of a roadway on which the motor vehicle is stopped.

5. The method of claim 1, wherein the motor vehicle also includes a transmission (10) connected between the prime mover (1) and the drive output (2), the transmission (10) including a plurality of shift elements (15, 16, 17, 18, 19), wherein at least one shift element of the plurality of shift elements (15, 16, 17, 18, 19) is engaged in order to couple the at least one coupling mass (6) to the shaft (3).

6. A control unit for operating a motor vehicle that includes a prime mover (1), a drive output (2), and a parking lock (4), the parking lock (4) configured to block a shaft (3) coupled to the drive output (2) in an engaged condition and to release the shaft (3) in a disengaged condition, the control unit configured to:
actuate at least one assembly (7) in order to couple at least one coupling mass (6) to the shaft (3) when the shaft is blocked and thereby increase a moment of inertia effective at the shaft (3); and
disengage the parking lock (4) while the at least one coupling mass (6) is coupled to the shaft (3).

7. The control unit of claim 6, wherein the control unit is further configured to:

prior to disengaging the parking lock (4), calculate a load acting upon the parking lock (4) or a load dependent upon the parking lock (4); and when the calculated load is greater than a limit value, actuate the at least one assembly (7) in order to couple the at least one coupling mass (6) to the blocked shaft (3).

8. The control unit of claim 7, wherein the control unit is further configured to determine the at least one coupling mass (6) based on a size of the calculated load.

9. The control unit of claim 7, wherein the control unit is further configured to calculate the load based on a mass of the motor vehicle and a grade of a roadway on which the motor vehicle is stopped.

10. The control unit of claim 6, wherein:

the motor vehicle also includes a transmission (10) connected between the prime mover (1) and the drive output (2), the transmission (10) including a plurality of shift elements (15, 16, 17, 18, 19); and the control unit is further configured to actuate at least one shift element of the plurality of shift elements (15, 16, 17, 18, 19) in order to couple the at least one coupling mass (6) to the shaft (3).

* * * * *